(12) United States Patent
Hiraguchi

(10) Patent No.: US 6,910,652 B2
(45) Date of Patent: Jun. 28, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 55 days.

(21) Appl. No.: 10/446,831

(22) Filed: May 29, 2003

(65) Prior Publication Data

US 2003/0222167 A1 Dec. 4, 2003

(30) Foreign Application Priority Data

May 29, 2002 (JP) ........................................ 2002-156424

(51) Int. Cl.⁷ ............................................. G11B 23/107
(52) U.S. Cl. ...................................... 242/348; 360/132
(58) Field of Search ............................ 242/348, 348.2; 360/132

(56) References Cited

U.S. PATENT DOCUMENTS 6,349,892 B2    2/2002   Morita et al.
6,752,341 B2 *  6/2004   Morita et al. ............... 242/348
2004/0061017 A1 * 4/2004  Hiraguchi ................ 242/348.2

\* cited by examiner

*Primary Examiner*—John Q. Nguyen
(74) *Attorney, Agent, or Firm*—Sughrue Mion, PLLC

(57) ABSTRACT

An opening, for pulling-out of a recording tape, and a closing member, which slides so as to open and close the opening, are provided at a substantially rectangular case of a recording tape cartridge which rotatably accommodates a single reel on which the recording tape is wound. An urging member, which urges the closing member in a direction of closing the opening, is attached to the closing member. An anchor projection, to which one end of the urging member is attached, is provided at an inner surface of the case. A holding projection, which projects in a same direction as the anchor projection and to which another end of the urging member is attached, is provided at the closing member. The recording tape cartridge is provided in which an assembly performance of the closing member and the urging member into the case is improved.

17 Claims, 8 Drawing Sheets

RECORDING TAPE CARTRIDGE

BACKGROUND OF THE INVENTION

1. Field of the Invention

The present invention relates to a recording tape cartridge accommodating, within a case, a single reel on which is wound a recording tape, such as a magnetic tape or the like, which is used as a recording/playback medium mainly in computers or the like.

2. Description of the Related Art

Conventionally, magnetic tape cartridges have been known in which a magnetic tape, which is used as a data recording/playback medium of a computer or the like, is wound on a single reel, and the reel is accommodated in a case. A leader member, such as a leader pin, a leader tape, or a leader block, is provided at the distal end of the magnetic tape. A pull-out mechanism provided at a drive device pulls the leader member out from an opening of the magnetic tape cartridge, and winds the magnetic tape fixed thereto onto a take-up reel of the drive device.

An open hole is formed in the bottom surface of the magnetic tape cartridge. A reel gear is formed in an annular form in the center of the bottom surface of the reel which emerges from the open hole. Due to a driving gear, which is provided at a rotating shaft of the drive device, meshing with this reel gear, the reel is driven to rotate. By driving the reel of the magnetic tape cartridge and the take-up reel of the drive device synchronously, data can be recorded onto the magnetic tape, and data recorded on the magnetic tape can be played back.

Little accommodating space is required at the time of storing the magnetic tape cartridge having such a structure, and a large amount of information can be recorded in the magnetic tape cartridge. The position of the opening and the type of the door which opens and closes the opening differ for each type of leader member. Namely, for example, when a leader pin 70 is used, as shown in FIG. 8, an opening 68 is formed in a side wall 64 of a case 62, which side wall 64 is parallel to the direction of loading the magnetic tape cartridge in a drive device (the direction of arrow P). The opening 68 is opened and closed by a door 66 which slides in the same direction as the loading direction.

A coil spring 67 is fit on a shaft 65 which projects from the rear end portion of this type of door 66. The rear end portion of the coil spring 67 is anchored on an anchor portion 69 provided at the case 62. The door 66 is thereby assembled within the case 62. In this way, the door 66 is usually urged in the direction of closing the opening 68. As the magnetic tape cartridge is loaded into a drive device, the door 66 slides in the direction opposite to the direction of arrow P, and opens the opening 68.

However, at the time of assembling this type of door 66 into the case 62, the work for anchoring the rear end portion of the coil spring 67 on the anchor portion 69 must be carried out. It is easy for this assembly operation to become complex, and the assembly performance (assemblability) of the coil spring 67 is not always good.

SUMMARY OF THE INVENTION

An object of the present invention is to provide a recording tape cartridge in which the assembly performance of a door (a closing member) and a coil spring (an urging member) within a case is improved.

In order to achieve the above object, one aspect of the present invention is a recording tape cartridge which is loaded into a drive device from a predetermined loading direction for use, the recording tape cartridge comprising: a case for rotatably accommodating, at an interior of the case, a single reel on which a recording tape is wound, the case having a wall surface in which is formed an opening for pulling-out of the recording tape; a closing member provided slidably within the case, for opening and closing the opening; and an urging member for urging the closing member to move in a direction of closing the opening, the urging member having end portions, wherein the case has, at the interior of the case, an anchor projection for attachment of one end portion of the urging member, and the closing member has a holding projection for attachment of another end portion of the urging member, and the holding projection and the anchor projection project in a same direction.

In accordance with this aspect, one end of the urging member, which urges the closing member in the direction of closing the opening, is attached to the anchor projection which projects at the inner surface of the case. The other end of the urging member is attached to a holding projection which projects at the closing member in the same direction as the anchor projection. Thus, the urging member can be attached from the side of the one direction in which both the anchor projection and the holding projection are directed. Assembly performance of the closing member and the urging member within the case can be improved.

DETAILED DESCRIPTION OF THE INVENTION

Hereinafter, a recording tape cartridge 10 relating to an embodiment of the present invention will be described on the basis of FIGS. 1 through 7. First, the overall structure of the recording tape cartridge 10 will be described briefly, and then the main portions relating to the present invention will be described in detail. Note that, for convenience of explanation, the direction of loading the recording tape cartridge 10 into a drive device is denoted by arrow A, and this direction of arrow A is the forward direction (front side of the recording tape cartridge 10). The direction of arrow B, which is orthogonal to the direction of arrow A, is the rightward direction.

(Overall Structure of Recording Tape Cartridge)

Figure 1:
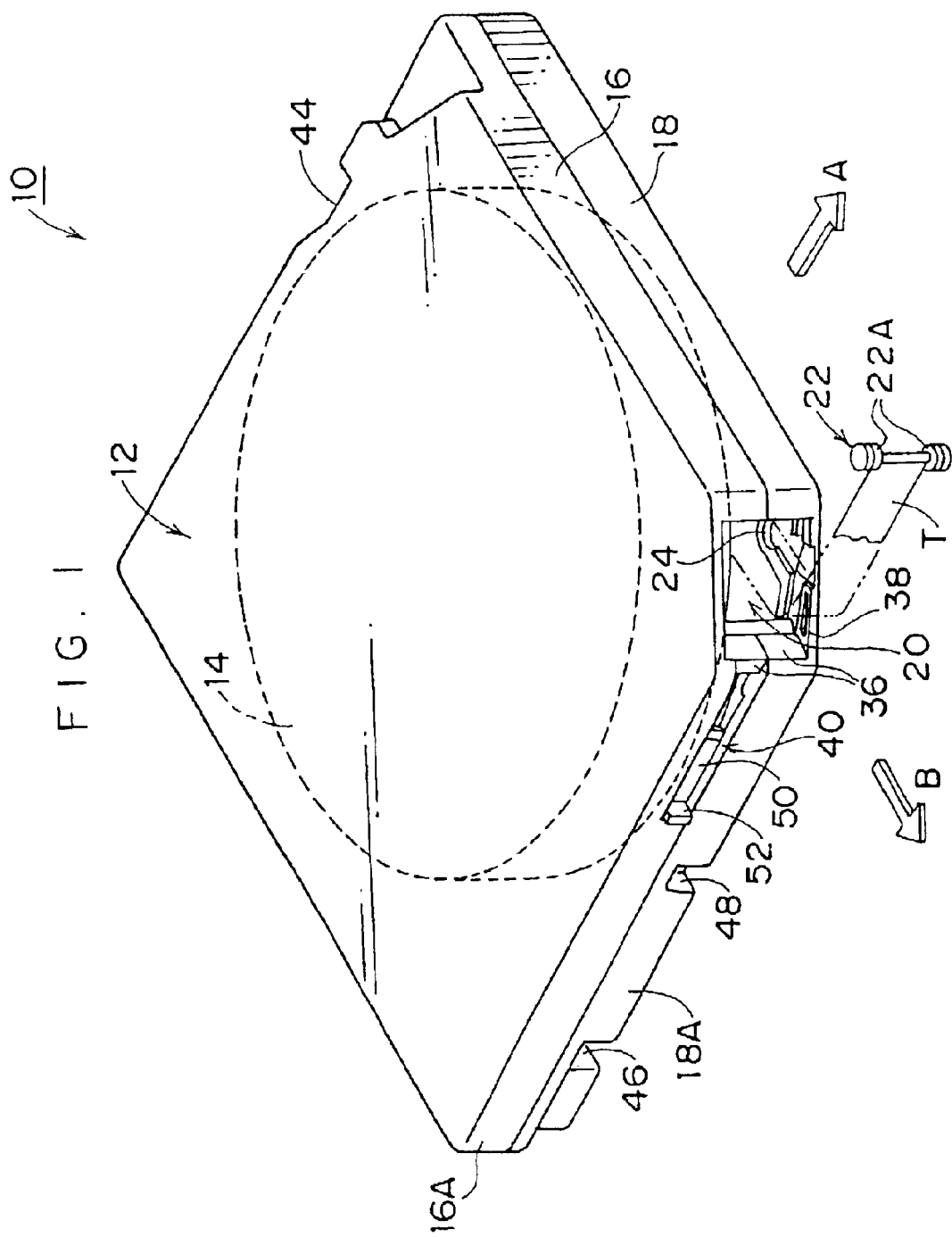
FIG. 1 is a schematic perspective view of a recording tape cartridge relating to an embodiment of the present invention.
Figure 2:
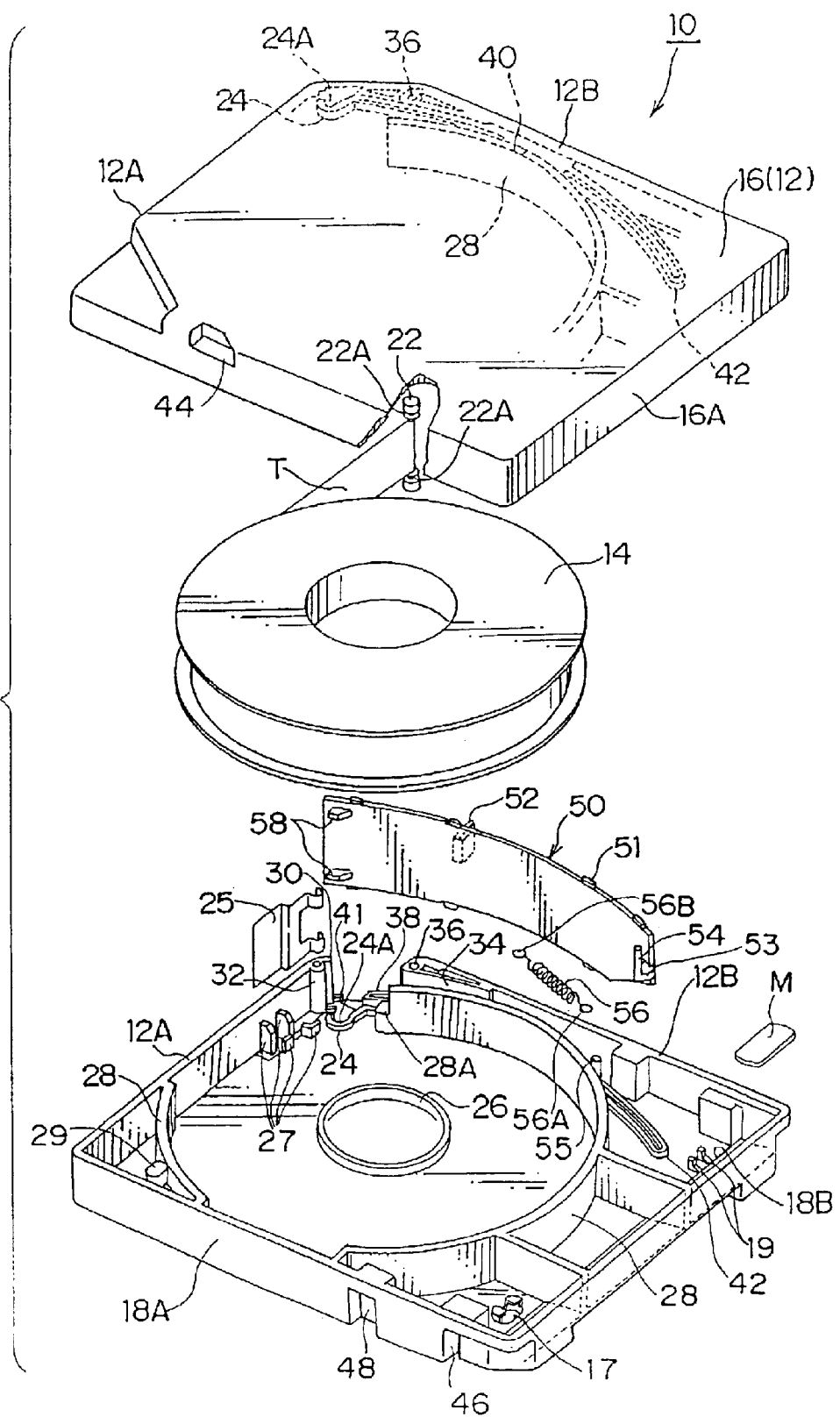
FIG. 2 is a schematic exploded perspective view of the recording tape cartridge relating to the embodiment of the present invention.

The overall structure of the recording tape cartridge 10 is shown in perspective view in FIG. 1, and a schematic exploded perspective view of the recording tape cartridge 10 is shown in FIG. 2. As shown in these figures, the recording tape cartridge 10 is structured such that a single reel 14, on which is wound a magnetic tape T serving as a recording tape which is an information recording/playback medium, is rotatably accommodated within a case 12 which is substantially rectangular as seen in plan view.

The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut off. A space for accommodating the reel 14, on which the magnetic tape T is wound, is provided at the interior of the case 12. Further, an opening 20, which is for pulling-out of the magnetic tape T, is formed at the corner portion of the upper case 16 and the lower case 18 at which corner portion the peripheral walls 16A, 18A have been cut.

A leader pin 22, which is pulled-out while being anchored (engaged) by a pull-out mechanism of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out mechanism. In this way, the hooks or the like do not contact and scratch the magnetic tape T at the time of pulling-out the magnetic tape T.

Figure 3:
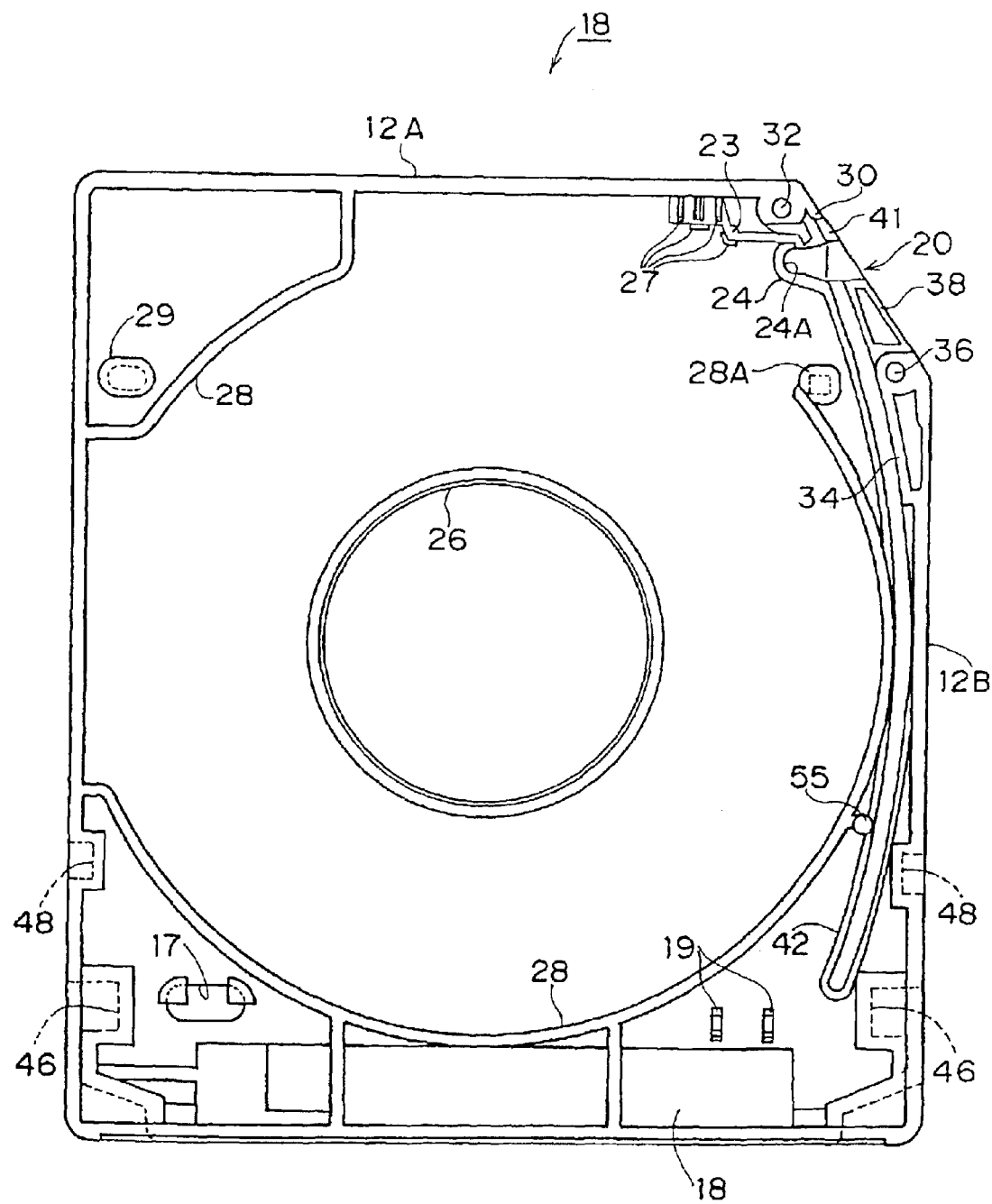
FIG. 3 is a schematic plan view of a lower case.
Figure 4:
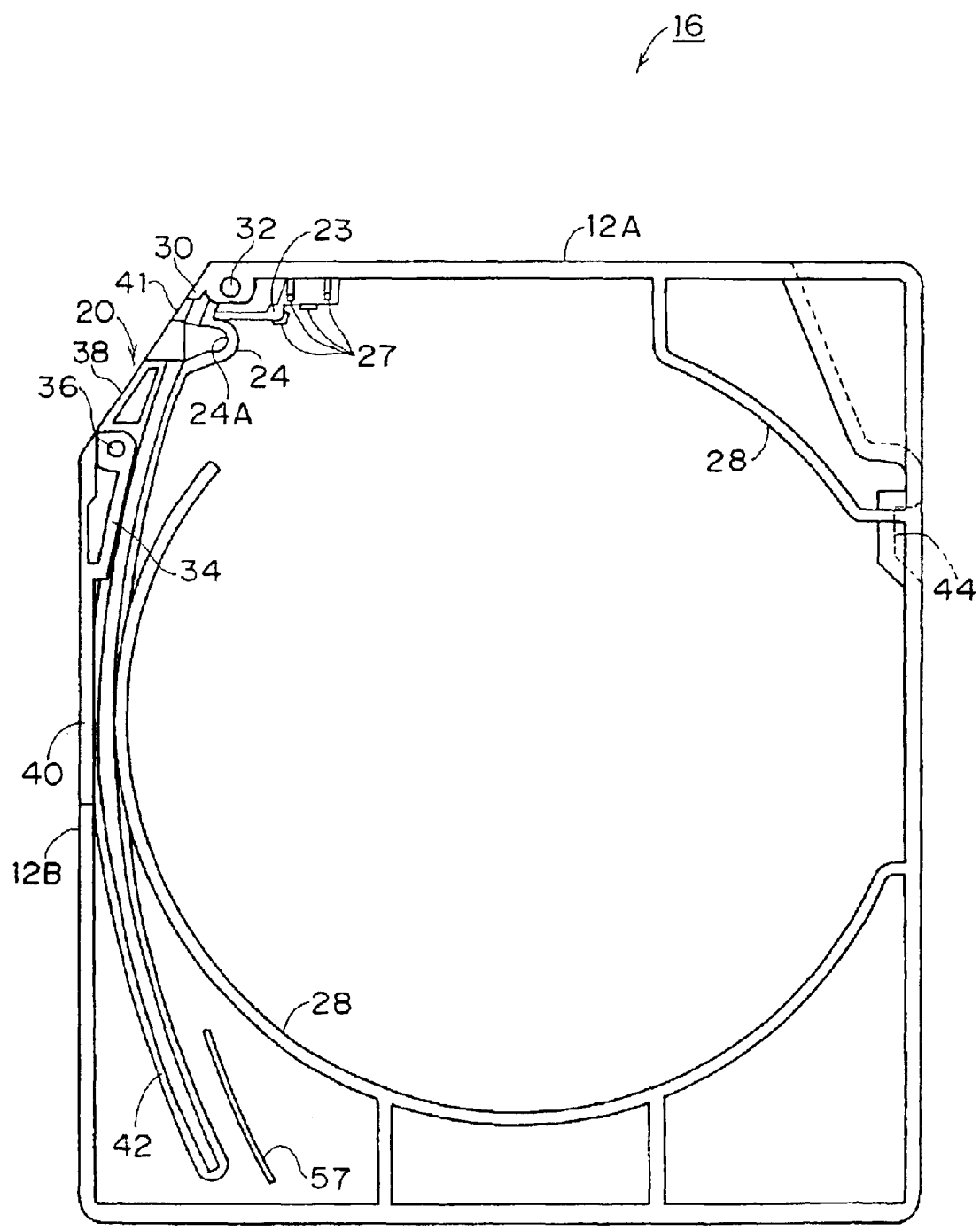
FIG. 4 is a schematic plan view of an upper case.

A pair of upper and lower pin holding portions 24, which position and hold the leader pin 22 within the case 12, are provided at the inner side of the opening 20 of the case 12. As shown in FIGS. 3 and 4 as well, the pin holding portions 24 are formed in substantially semicylindrical shapes. The both end portions of the leader pin 22, which is in a state of standing upright, are held in concave portions 24A of the pin holding portions 24. The magnetic tape T pull-out sides of the outer peripheral walls of the pin holding portions 24 are open, so as to form an entrance/exit into and from which the leader pin 22 can enter and exit.

In vicinities of the pin holding portions 24, a proximal portion of an anchor spring 25 is inserted and fixed in spring holding portions 27 and groove portions 23 (see FIGS. 3 and 4) which are provided at the inner surface of the front wall 12A. (The front wall 12A is the portions of the peripheral walls 16A, 18A where the outer surfaces thereof face in the direction of arrow A.) The distal ends of the anchor spring 25, which have been divided so as to be forked in two, engage the upper and lower ends of the leader pin 22 and hold the leader pin 22 in the pin holding portions 24. When the leader pin 22 enters into and exits from the pin holding portions 24, the distal end portions of the anchor spring 25 elastically deform appropriately so as to permit movement of the leader pin 22.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not shift (so as to not joggle) by play restricting walls 28 which project out at portions of the inner surfaces of the upper case 16 and the lower case 18, and which serve as inner walls which are on a circular locus which is coaxial with the gear opening 26.

A bag portion (concave portions) 28A, in which a hole for position regulation is formed, is provided so as to be continuous with the end portion of the play restricting wall 28 in a vicinity of the opening 20. Further, a bag portion 29, in which is formed a hole for position regulation which is a long hole, is provided so as to be set apart from the play restricting wall 28 at the inner side of the front left corner portion of the case 12. The bag portions 28A, 29 are disposed on a single straight line which extends along the direction of arrow B. The end portions of the play restricting walls 28, except for the end portion thereof at which the bag portion 28A is continuous, are continuous with (are provided so as to be connected to) the peripheral wall 16A or the peripheral wall 18A of the case 12, so as to partition the outer sides of the play restricting walls 28 and the space at which the reel 14 is set.

A memory board M, which stores various types of information, is set at the rear right portion of the lower case 18 for each recording tape cartridge 10. A rear portion inner wall 18B is formed at an inclined surface of a predetermined angle and the memory board M is supported by supporting projections 19 and disposed so as to be inclined at a predetermined angle, such that sensing is possible at a drive device which reads the information from the bottom surface side and at a library device which reads the information from the rear wall side. Further, a write protect tab (not illustrated), which is set so that recording onto the recording tape cartridge 10 is possible or is not possible, is provided at the left rear portion of the lower case 18. An open hole 17, from which an recognition portion (not illustrated) for write protection, is formed in the left rear portion of the lower case 18.

(Opening, and Structure of Case in Vicinity of Opening)

As described above, the opening 20 is formed by cutting off the front right corner portion of the case 12, and the plane of opening of the opening 20 is directed in the direction of arrow A and the direction of arrow B. Thus, the pull-out mechanism of the drive device can access and engage the leader pin 22 from the direction of arrow A, from the direction of arrow B, or from between the direction of arrow A and the direction of arrow B. In this way, the area at which the pin holding portions 24, which hold the leader pin 22, can be set is broad, and the region over which the pull-out mechanism of the drive device can engage the leader pin 22 is broad. Thus, the position at which the pin holding portions 24 are set can be set in accordance with the specifications of the drive device which engages the leader pin 22 from the direction of arrow A or the direction of arrow B. Therefore, the degrees of freedom in designing the drive device are increased.

A pair of upper and lower short, inclined wall portions 30, which prescribe the front edge portion of the opening 20, are provided at the right end portion of the front wall 12A of the case 12. The inclined wall portions 30 are bent along the plane of opening of the opening 20, and serve as dustproofing walls which prevent the entry of dust or the like into the case 12. Further, a pair of upper and lower screw bosses 32 are provided so as to be continuous with the inner side of the front wall 12A in a vicinity of the left side of the inclined wall portions 30.

On the other hand, a pair of upper and lower inclined wall portions 34, which are shaped, in plan view, so as to substantially run along the outer peripheral surface of a door 50 which will be described later, are provided at the inner side of the front end portion of a right wall 12B of the case 12. (The right wall 12B is the portions of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting out the lower portion of the front side of the peripheral wall 16A of the upper case 16 which forms the right wall 12B. The slit 40 opens toward the opening 20 side as well. Thus, the outer surface of the screw boss 36 at the upper case 16 is exposed from the slit 40 (see FIG. 1).

The upper end of the slit 40 may be merely prescribed by the ceiling plate of the case 12 (the ceiling plate of the upper case 16). However, the rigidity of the case 12 can be maintained by leaving a portion of the peripheral wall 16A at the upper side. This is preferable also in terms of the strength with respect to impact at the time of a drop or the like. In particular, it is even more preferable that the upper side wall prescribing the slit 40 is integral and continuous with the inclined wall portion 34.

A concave portion 48 is formed at the rear side of the lower case 18. The portion of the concave portion 48, other than the upper end of the peripheral wall 18A, is recessed toward the inner side of the case 12 in a sideways, substantially U-shaped configuration as seen in a planar cross-sectional view, and is recessed upwardly from the bottom surface of the case 12 as well (i.e., the bottom plate is notched). The concave portion 48 is formed in the left wall of the case 12 as well. The concave portions 48 are engagement portions which, for example, a pull-in mechanism of a drive device engages. The bottom surfaces (downwardly-facing surfaces) thereof are reference surfaces for positioning within the drive device.

Further, a concave portion 46 is formed at the rear side of the concave portion 48. The portion of the concave portion 46, other than the upper end of the peripheral wall 18A, is recessed toward the inner side of the case 12 in a sideways, substantially U-shaped configuration as seen in a cross-sectional view, and is recessed upwardly from the bottom surface of the case 12 as well (i.e., the bottom plate is notched). The concave portions 46 are engagement portions which a grasping mechanism of a library device engages. By providing the concave portions 46, 48, the strength of the case 12 (the lower case 18) with respect to twisting is improved. Moreover, a concave portion 44, which is substantially trapezoidal as seen in plan view, is formed in the top surface portion of the left wall of the upper case 16. This concave portion 44 is an engagement portion which is engaged by a holding member (not shown) for canceling the rotation (moment) accompanying the movement of the door 50 in the direction of opening at the time of opening the opening 20.

Guide wall portions 42 of predetermined heights (e.g., about 1.0 mm to 1.5 mm) stand erect at the upper case 16 and the lower case 18. The guide wall portions 42 support convex portions 51 of the door 50 which will be described later, so as to sandwich the convex portions 51 from both the inner surface side and the outer surface side thereof, from the vicinity of the opening 20 to a vicinity of the region where the play restricting walls 28 are closest to the right wall 12B (hereinafter called the front half), and from a vicinity of the rear end of the slit 40 to a vicinity of the rear wall (hereinafter called the rear half).

The lengths of the guide wall portions 42 are different at the upper case 16 and the lower case 18. The guide wall portion 42 at the upper case 16 side is formed such that the rear half thereof is longer than that of the guide wall portion 42 at the lower case 18 side. This is because the memory board M is disposed so as to be inclined at a predetermined angle at the right wall 12B side of the rear portion inner wall 18B of the lower case 18. Note that the rear end portions of the rear halves of the guide wall portions 42 are closed in substantial arc-shapes as seen in plan view. The movement of the convex portions 51, which are furthest rearward at both the top and the bottom of the door 50, is restricted thereby such that the door 50 cannot move any further rearward.

The front end portions of the front halves of the guide wall portions 42 are open, and extend to positions where they do not impede the entry and exit of the leader pin 22 at the time when the leader pin 22 enters and exits. (In the illustrated embodiment, these front end portions extend to a position which is rearward of the pin holding portions 24, and is at about the middle of the opening width of the opening 20.) Guide wall portions 41, whose rear end portions are open, stand erect in vicinities of the inclined wall portions 30 so as to be positioned on imaginary lines extending from the guide wall portions 42. The rear end portions of the guide wall portions 41 do not extend further rearward of the front ends of the pin holding portions 24, so as to not impede the entry and exit of the leader pin 22. The door 50 closes the opening 20 in a state in which the leading end of the door 50 has entered into the guide wall portions 41.

Further, the guide wall portions 41 and the front halves of the guide wall portions 42 are formed to be slightly shorter heights than the rear halves of the guide wall portions 42. Namely, for example, the heights of the guide wall portions 41 and the front halves of the guide wall portions 42 are about 1 mm, whereas the heights of the rear halves of the guide wall portions 42 are 1.5 mm. This is in order to ensure space for entry of the pull-out mechanism of the drive device which engages and pulls out the leader pin 22. Accordingly, as will be described later, the plate width (height) of the door 50 at the front half portion thereof (at least the portion of the door 50 which closes the opening 20), is wider (taller) by an amount corresponding to the amount by which the guide wall portions 41 and the front halves of the guide wall portions 42 are shorter.

Ribs 38, which are substantially trapezoidal in plan view and are integral with the outer sides of the guide wall portions 42 which are exposed from the opening 20, stand erect to the same heights as these guide wall portions 42, at the inner surface of the upper case 16 and the inner surface of the lower case 18. The strength of the upper case 16 and the lower case 18 at the opening 20 portion is ensured by the ribs 38. Note that the inner sides of the guide wall portions 42 are formed to be continuous with and integral with the pin holding portions 24. The heights of the pin holding portions 24 are preferably substantially equal to or higher than the heights of the guide wall portions 42 which are integral and continuous therewith.

The upper case 16 and the lower case 18, which are as described above, are fixed (joined) together by screws being screwed, from beneath, into the screw bosses 32, 36 which are positioned in vicinities of the edge portions of the opening 20. In this way, the opening 20 is defined (prescribed) by the end portions of the inclined wall portions 30 (the front wall 12A) and the inclined wall portions 34 (the right wall 12B), and the corner portions at both ends of the opening 20 are joined together strongly. Thus, even if the case 12 is dropped, positional offset due to deformation or buckling does not occur. Note that the surfaces of the peripheral walls 16A, 18A which oppose one another may be fixed together by welding. However, it is preferable to join the peripheral walls 16A, 18A together by screws, in consideration of the disassembly performance of and the ability to recycle the case 12.

(Structure of Door)

Figure 5:
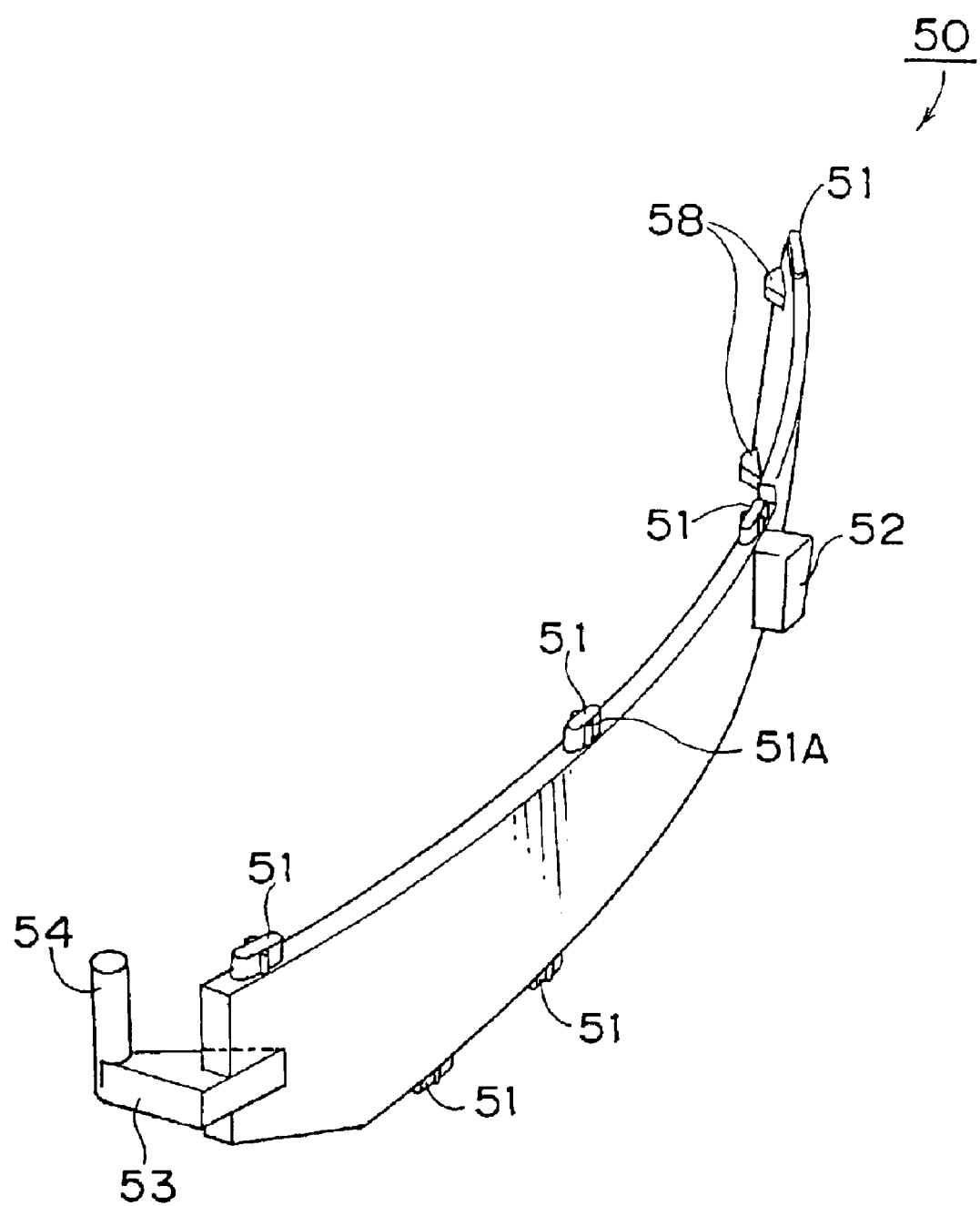
FIG. 5 is a schematic perspective view of a door.
Figure 6:
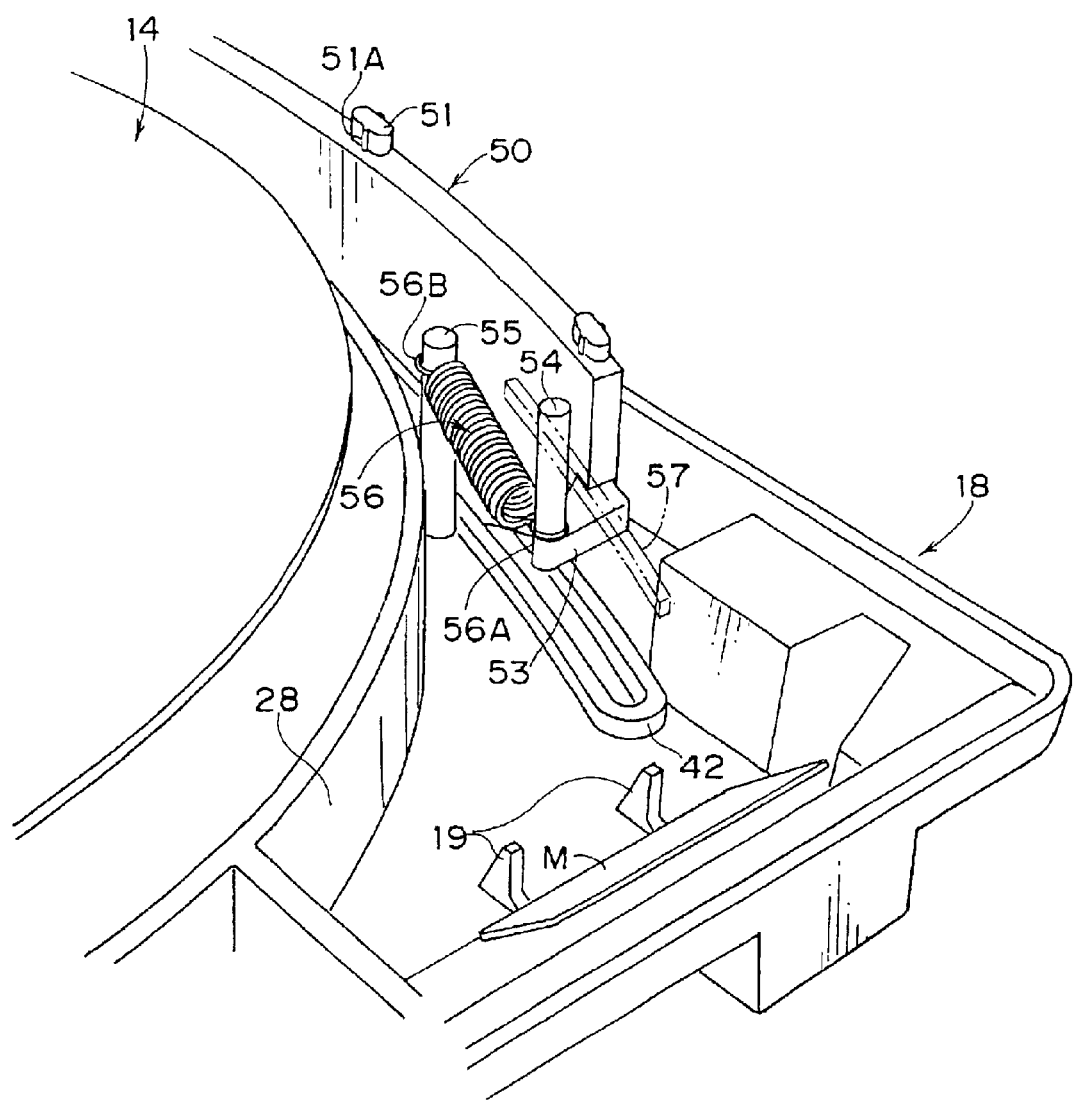
FIG. 6 is a schematic perspective view showing a state in which a rear portion of the door is assembled in a case.

The above-described opening 20 is opened and closed by the door 50 which serves as a closing member. As shown in FIGS. 2, 5 and 7, the plate width (height) of the portion of the door 50 which slides at the guide wall portions 41 and the front halves of the guide wall portions 42 (i.e., at least the portion which closes the opening 20) is formed to be substantially the same height as the opening height of the opening 20. The portion of the door 50 which is further rearward is formed to be slightly smaller (lower). The plate length of the door 50 is formed to be sufficiently longer than the opening width (length) of the opening 20. The door 50 is formed in a substantial arc-shape, in plan view, which curves along the direction of plate thickness thereof, so as to be able to move along a predetermined circumference.

The door 50 closes the opening 20 (see FIG. 7A) in a state in which the distal end portion of the door 50 has entered into the guide wall portions 41. When the door 50 slides (rotates) substantially rearward along the aforementioned predetermined circumference so as to open the opening 20 (see FIG. 7B) and the outer peripheral surface of a vicinity of the distal end of the door 50 reaches a vicinity of the screw bosses 36, the opening 20 is completely opened (see FIG. 7C). Further, the door 50 closes the opening 20 by sliding (rotating) in the direction opposite to the direction at the time of opening the opening 20.

In this way, the door 50 is formed so as to be curved in accordance with the arc which is the locus of movement thereof. In the present embodiment, the center of rotation of this arc is set to be in a vicinity of the left side wall of the case 12 at a position substantially corresponding to the rear end of the slit 40. In this way, the locus of movement of the door 50 comes closest to the right wall 12B of the case 12 in a vicinity of the rear end of the slit 40. Note that the center of rotation and the radius of the door 50 may be appropriately determined in accordance with the requirements of the drive device or the library device.

The curved longitudinal dimension of the door 50 is determined such that, in the state in which the door 50 opens the opening 20, the rear end portion of the door 50 is positioned in the right rear corner portion of the case 12, which is further toward the rear than the concave portion 48 (i.e., the right rear corner portion in a vicinity of the concave portion 46). The bottom rear portion of the door 50 is cut obliquely in order to avoid the memory board M which is disposed obliquely at a predetermined angle at the rear portion inner wall 18B of the lower case 18.

The convex portions 51 project at the top surface (top edge surface) and the bottom surface (bottom edge surface) of the door 50. The convex portions 51 slide along the guide surfaces of the guide wall portions 42 (the inner side surfaces which oppose one another), and along the inner surface of the upper case 16 and the inner surface of the lower case 18 between the guide wall portions 42, so as to guide the door 50 in the directions of opening and closing the opening 20. The convex portions 51 are formed in substantial oval shapes as seen in plan view which are long along the longitudinal direction of the door 50. Four convex portions 51 project at each of the top surface and the bottom surface of the door 50 so as to have top/bottom symmetry (except for the convex portions 51 furthest toward the rear), and so as to project to substantially the same heights as the heights of the guide wall portions 42 (e.g., about 0.5 mm at the front side of the boundary portion where the plate width of the door 50 changes, and about 1.5 mm at the rear side of this boundary portion). Note that the convex portions 51 furthest toward the rear do not have top/bottom symmetry because the bottom rear portion of the door 50 is cut obliquely.

The distal ends (top ends and bottom ends) of the convex portions 51 are formed in substantial arc-shapes in cross-sectional view (side view). Projections 51A, which are substantially arc-shaped in plan view or substantially triangular in plan view, project in left and right directions at both side portions (side surfaces) of the convex portions 51. Accordingly, when the convex portions 51 are inserted between the guide wall portions 42 and slide, only the substantially arc-shaped distal ends of the convex portions 51 contact the inner surface of the upper case 16 and the inner surface of the lower case 18, such that there is point contact thereat. The distal ends of the projections 51A, which are substantially arc-shaped or the like, contact the mutually opposing guide surfaces of the guide wall portions 42, such that there is linear contact thereat.

Thus, the sliding resistance (friction) between the top and bottom convex portions 51 and the inner surface of the upper case 16 and the inner surface of the lower case 18 between the guide wall portions 41 and the guide wall portions 42, and the sliding resistance (friction) between the top and bottom convex portions 51 and the guide surfaces of the guide wall portions 41 and the guide wall portions 42, can be reduced. The door 50 can be slid smoothly with little resistance. Further, when the convex portions 51 are formed in substantially oval shapes as seen in plan view, the impact resistance thereof is better than if they were formed in, for example, substantially circular shapes as seen in plan view. Thus, even if force is applied to the door 50 from a direction other than the opening/closing directions due to the impact of a drop or the like, the convex portions 51 can be prevented from breaking.

The operation projection 52, which serves as an operation portion, projects in the radial direction of the door 50 at the outer peripheral surface of the door 50, slightly further forward than the longitudinal direction central portion of the door 50 (i.e., in a vicinity of the boundary portion where the plate width of the door 50 changes). The operation projection 52 is exposed to the exterior of the case 12 from the slit 40, and is positioned so as to be set apart slightly from the rear ends of the screw bosses 36 when the opening 20 is in a closed state, and can be operated from the portion of the slit 40 which is open toward the front. In the state in which the opening 20 is open, the operation projection 52 is positioned so as to be set apart slightly from the rear edge of the slit 40, and at this time, the convex portions 51 which are positioned the furthest rearward abut the rear end portions of the guide wall portions 42.

Further, the interior and exterior of the case 12 communicate through the slit 40 for exposing the operation projection 52. However, the adhesion of dust and the like to the magnetic tape T wound on the reel 14 is prevented by the play restricting walls 28 serving as inner walls, and by the slit 40 always being substantially closed by the screw bosses 36 and the door 50 (which has a width extending over substantially the entire height of the interior of the case 12).

A coil spring 56, which serves as an urging member which urges the door 50 in the direction of closing the opening 20, has a length such that it extends to the rear right corner portion of the case 12 in the state in which the door 50 opens the opening 20. Thus, the space between the play restricting walls 28 and the right wall 12B (the peripheral walls 16A, 18A) at the rear right corner portion can be utilized effectively. Namely, a supporting plate 53 projects integrally at the inner peripheral surface of the door 50 in the vicinity of the rear end thereof. A solid cylindrical holding projection 54 projects integrally from the top surface of the supporting plate 53 so as to be directed upwardly, such that a spring holding portion, which is substantially L-shaped in rear view, is formed.

A solid cylindrical projection 55 projects, so as to be directed upwardly, at the inner surface of the lower case 18 in a vicinity of the concave portion 48. Ring-shaped (i.e., loop-shaped) attachment portions 56A, 56B are formed at the both ends of the coil spring 56. A height of the anchor projection is such that the anchor projection projects beyond the upper end of the peripheral wall 18A of the lower case 18 (i.e., the anchor projection is higher than the peripheral wall 18A). Accordingly, the one attachment portion 56B of the coil spring 56 is placed on the anchor projection 55 from above such that the anchor projection 55 is inserted through the attachment portion 56B, and the other attachment portion 56A is placed on the holding projection 54 from above such that the holding projection 54 is inserted through the attachment portion 56A. The coil spring 56 can thereby be attached simply within the aforementioned space. The anchor projection 55 is formed such that at least a portion thereof connects to the play restricting walls 28, whereby the anchor projection 55 being caused to fall down by tension from the coil spring 56, or the like, is prevented.

Namely, when the holding projection 54 and the anchor projection 55, at which the attachment portions 56A, 56B of the coil spring 56 are attached, project upwardly (in the same one direction) as described above, it is possible to attach the coil spring 56 by placing the coil spring 56 thereon from the top sides thereof (i.e., from the side in the one direction). Thus, the assembly performance of the door 50 and the coil spring 56 (the ability to incorporate the door 50 and the coil spring 56 into the case 12) can be improved. Note that, when the case 12 is disassembled as well, the coil spring 56 can be easily removed merely by being pulled upward (in one direction). Thus, the work for assembling and the work for disassembling are very convenient.

A rib 57, along which the top portion of the holding projection 54 slides at the time of opening and closing the door 50, stands erect in a substantial arc-shape in plan view at the upper case 16. The rib 57 is disposed at a position and has a length such that the holding projection 54 can slide within the rib 57 at least when the door 50 starts to move (open). Due to the rib 57 suitably guiding the holding projection 54 which moves against the urging force of the coil spring 56, the door 50 can be opened more stably (the door 50 is not displaced (does not shake) left and right due to the urging force of the coil spring 56 at the time of opening).

Further, by providing the rib 57, even if the attachment portion 56A of the coil spring 56 which is attached as described above rises up along the holding projection 54 due to an impact caused by a drop or the like being applied to the case 12, the attachment portion 56A does not come off of the holding projection 54. Note that, the top end of the anchor projection 55 as well is inserted between the play restricting wall 28 and the guide wall portion 42 of the upper case 16. Thus, in the same way, the attachment portion 56B can be prevented from coming off of the anchor projection 55.

Stoppers 58, which abut the upper end portion side surface and the lower end portion side surface of the leader pin 22 when the opening 20 is closed, project at the inner surface of the front end portion of the door 50. The stoppers 58 can even more reliably prevent the leader pin 22 from falling out from the pin holding portions 24 due to impact at the time the recording tape cartridge 10 is dropped or the like. Moreover, the inner surface and/or the outer surface at the front end portion of the door 50 which enters into the guide wall portions 41 is preferably formed as a tapered surface so as to smoothly enter into the guide wall portions 41. At the door 50 shown in FIG. 7, a tapered surface 50A is formed at the outer surface side thereof.

Next, operation of the present embodiment will be described. When the recording tape cartridge 10 having the above-described structure is not being used (i.e., is being stored, is being transported, or the like), the opening 20 is closed by the door 50. Specifically, due to the urging force of the coil spring 56, the door 50 is always urged in the direction of closing the opening 20, and closes the opening 20 in a state in which the distal end portion (front end portion) of the door 50 has entered in the guide wall portions 41 which are in a vicinity of the inclined wall portions 30.

Figure 7A:
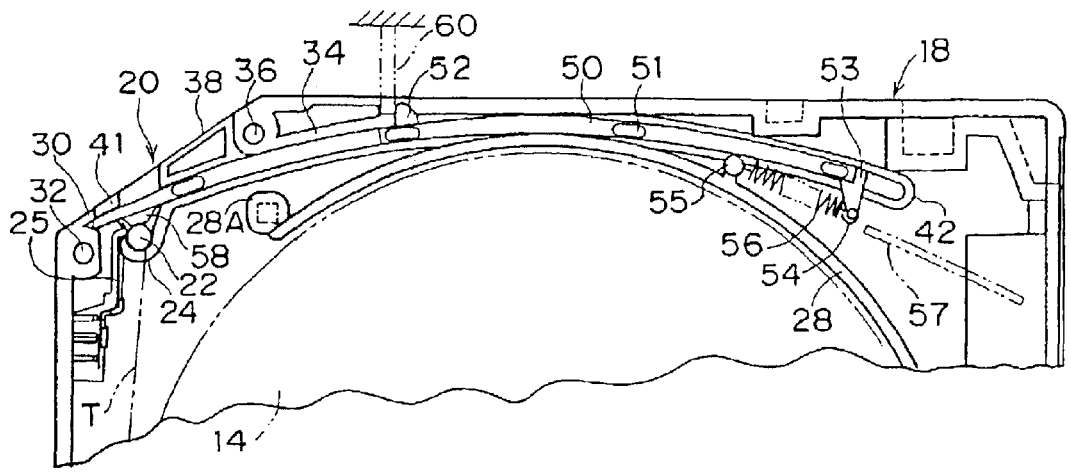
FIGS. 7A, 7B and 7C are respectively schematic diagrams for explanation, which show the order of processes of opening the door which is assembled in the case.
Figure 7B:
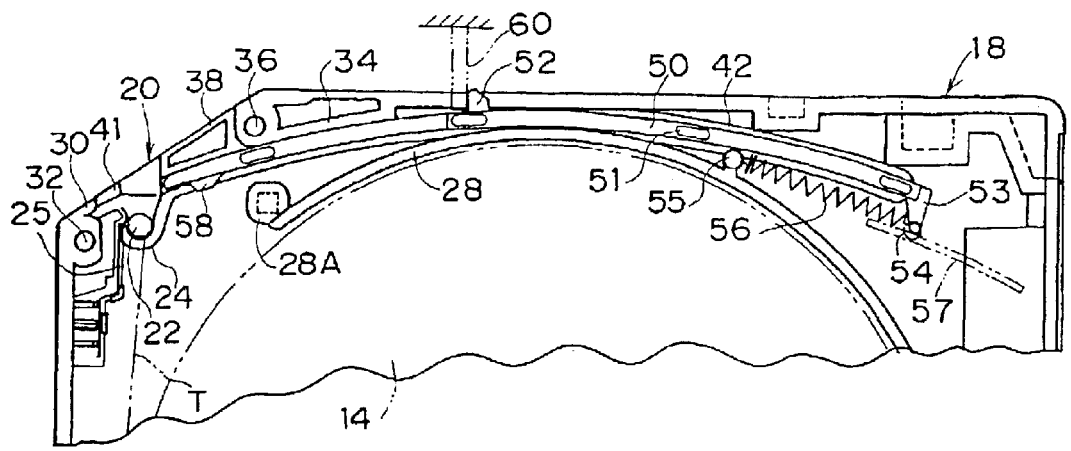

On the other hand, when the magnetic tape T is to be used, the recording tape cartridge 10 is loaded into a drive device along the direction of arrow A. Accompanying this loading, as shown in FIG. 7A, an opening/closing member 60, which serves as an opening/closing mechanism of the drive device, enters into the slit 40 which opens toward the front, and engages with the operation projection 52 of the door 50. In this state, when the recording tape cartridge 10 (the case 12) is pushed in further, as shown in FIG. 7B, due to the pushing-in force, the opening/closing member 60 moves the operation projection 52 rearward against the urging force of the coil spring 56 (i.e., moves the operation projection 52 rearward relative to the case 12 which is loaded in the direction of arrow A).

Figure 7C:
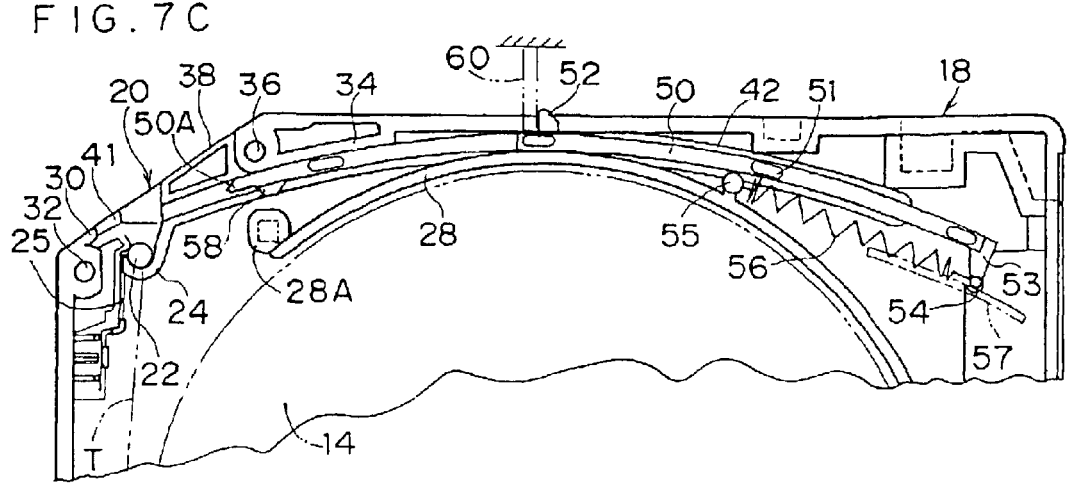
Figure 8:
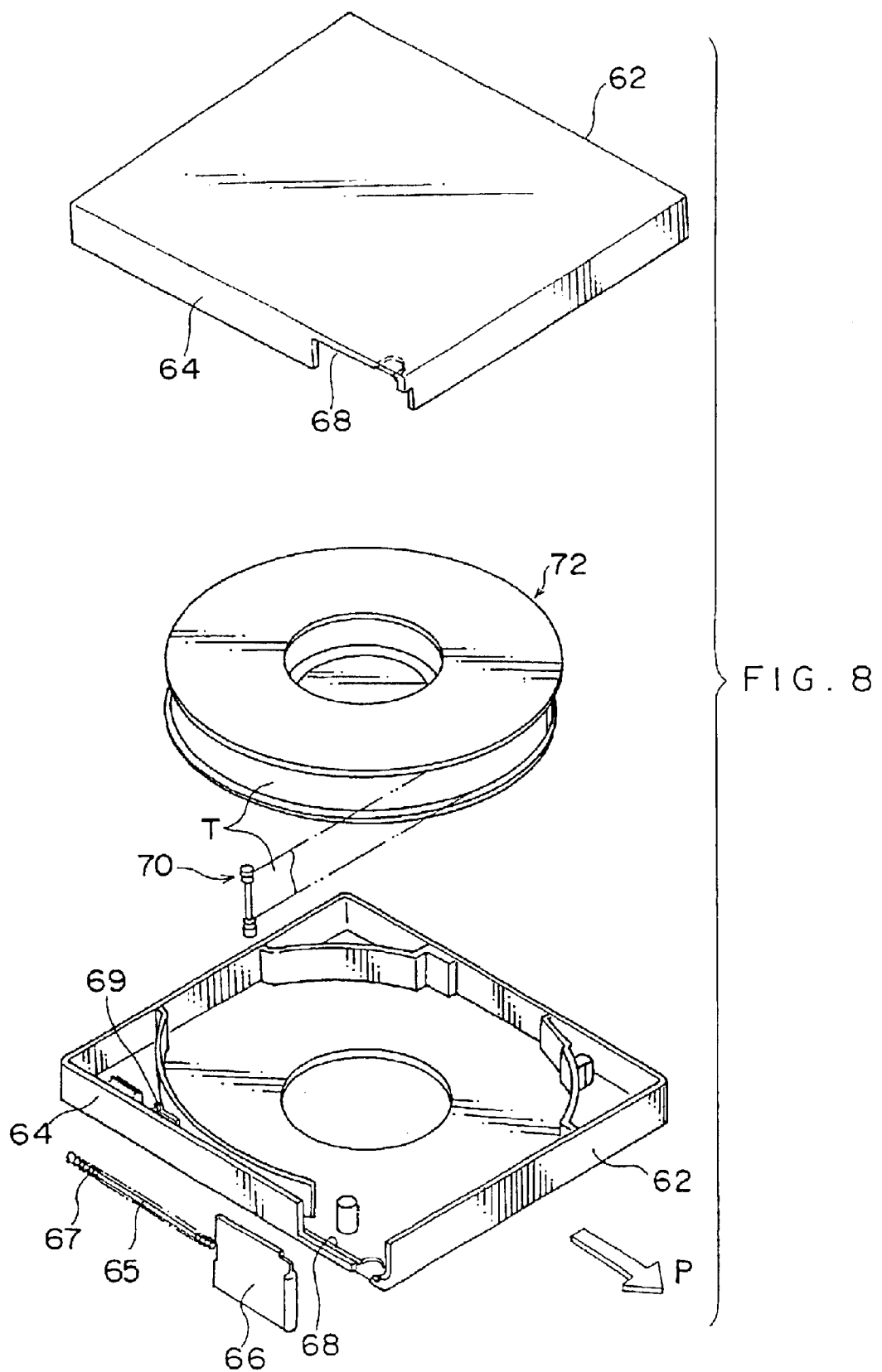
FIG. 8 is a schematic exploded perspective view of a conventional magnetic tape cartridge equipped with a leader pin.

Then, while the convex portions 51 are guided by the guide wall portions 42, the door 50, from which the operation projection 52 projects, rotates clockwise as seen in plan view along the direction of curving thereof. Namely, due to the guide wall portions 42, the door 50 moves substantially rearward so as to circle around the outer sides of the pin holding portions 24 and the reel 14 without jutting out from the locus of movement along the curved configuration of the door 50, and opens the opening 20. Then, when the case 12 (the recording tape cartridge 10) is loaded to a predetermined depth in the drive device, the opening 20 is completely opened as shown in FIG. 7C.

At this time, the holding projection 54, to which one end of the coil spring 56 is attached, is suitably guided by the rib 57. Thus, the coil spring 56 suitably extends between the guide wall portion 42 and the rib 57 as seen in plan view. Accordingly, swinging (shaking) of the coil spring 56 itself is suppressed, and the door 50 can move stably (without shaking) even when moving against the urging force of the coil spring 56. Thus, the opening 20 can always be opened in a stable state.

When the recording tape cartridge 10 is positioned within the drive device in this state in which the opening 20 is opened, further rotation (substantially rearward movement) of the door 50 is restricted. The pull-out mechanism of the drive device enters into the case 12 from the opening 20 which has been opened. The pull-out mechanism pulls-out the leader pin 22 which is positioned and held at the pin holding portions 24, and accommodates the leader pin 22 at an unillustrated take-up reel. Due to the take-up reel and the reel 14 being driven to rotate synchronously, the magnetic tape T is successively pulled-out from the case 12 while being taken-up onto the take-up reel. Information is recorded or played back by a recording/playback head or the like disposed along the predetermined tape path.

On the other hand, when the magnetic tape T is rewound onto the reel 14 and the recording tape cartridge 10 is to be ejected from the drive device, the positioned state of the recording tape cartridge 10 is released, and the recording tape cartridge 10 is moved in the direction opposite to the direction of arrow A by an unillustrated ejecting mechanism. Then, the door 50 is rotated in the direction of closing the opening 20 by the urging force of the coil spring 56, while the convex portions 51 are guided by the guide wall portions 42. Due to the distal end portion of the door 50 entering into the guide wall portions 41, the opening 20 is completely closed and returned to its initial state.

Here, the opening 20 is formed by cutting off a loading side corner portion of the rectangular case 12. Thus, the plane of opening of the opening 20 is directed in the direction of arrow A and the direction of arrow B (the plane of opening is inclined with respect to the direction of arrow A). In other words, the pull-out mechanism of the drive device can access the leader pin 22 from the front surface side of the case 12, and there is no need for the pull-out mechanism to access the leader pin 22 from the outer side (the arrow B side) of the arrow B side peripheral walls (side walls) 16A, 18A. Thus, in the drive device, the path for pulling-out the magnetic tape T can be made to be the shortest, and there is no need for a mechanism for making the pull-out mechanism circle around from the arrow B side of the case 12. Thus, the drive device can be made to be more compact and less expensive.

The door 50, which is curved in an arc-shape, opens and closes the opening 20 by moving so as to circle around the outer sides of the reel 14 and the pin holding portions 24 (the leader pin 22), without jutting out from the locus of movement which runs along the curved configuration of the door 50 (a locus which runs substantially along the outer peripheral portion of the reel 14). Thus, at the time of opening and closing the opening 20, the door 50 does not jut out from the region prescribed by the outer shape of the case 12.

Thus, the space for accommodating the recording tape cartridge 10 within the drive device is small, the drive device can be made compact, and the space within the drive device can be used effectively. Moreover, the locus of movement of the door 50 does not interfere with the pin holding portions 24 (the leader pin 22) or the reel 14 within the case 12, and the space needed for opening and closing the door 50 can be kept small. Therefore, the space within the case 12 can be utilized effectively.

It suffices for the opening/closing member 60 of the drive device to be disposed and fixed so as to be able to merely enter into the slit 40 from the front and engage with the operation projection 52 of the door 50. The structure is therefore simple. Moreover, because the door 50 closes the opening 20 due to the urging force of the coil spring 56, there is no need at the drive device for a mechanism for driving the door 50 in the direction of closing the opening 20. The structure of the opening/closing mechanism of the drive device can be made to be even more simple.

In this way, the recording tape cartridge 10 relating to the present embodiment has the opening 20 which is structured such that the path along which the magnetic tape T is pulled out is the shortest. Thus, the space for accommodating the recording tape cartridge 10 within the drive device can be made small, and the door 50 can open and close without interfering with the reel 14 and the leader pin 22. Moreover, the opening/closing mechanism (including the opening/closing member 60) for operating the door 50 so as to open and close the opening 20 can be made to have a simple structure.

Moreover, as described above, the locus of movement of the door 50 is a circumference (the shape of a curve). Thus, it is possible to form the opening 20 to be large by cutting off a large amount of a corner portion of the case 12. Namely, in a case in which the opening 20, which is inclined with respect to the direction of arrow A, is opened and closed by a flat-plate-shaped closing member for example, when an attempt is made to accommodate this closing member within the region of the outer shape of the case 12 in the state in which the opening 20 is open, the opening 20 must be opened and closed while changing the posture of the closing member by rectilinear movement and rotational movement, and the region over which the closing member operates is large. The opening 20 must be made small (the cut-off amount of the corner portion of the case 12 at which the opening 20 is formed must be made small) in order for the region of operation of the closing member to not interfere with the leader pin 22 and the reel 14. In the recording tape cartridge 10 relating to the present embodiment, as described above, the opening 20 can be made large by providing the door 50 which opens and closes the opening 20 by rotating without jutting out from the predetermined circumference.

In particular, the center of rotation of the door 50 for opening and closing the opening 20 whose plane of opening is inclined with respect to the direction of arrow A, can be determined independently of the axially central position of the reel 14. Thus, the angle of inclination of the plane of opening of the opening 20 with respect to the direction of arrow A, the size of the opening 20 (the distance between the front and rear edge portions thereof), and the like can be set arbitrarily, and it is possible to obtain the door 50 which opens and closes the opening 20 of an arbitrary configuration and arbitrary dimensions corresponding to the requirements of drive devices and the like. Namely, the degrees of freedom in designing the opening 20 (the recording tape cartridge 10) are increased.

Further, when the path for pulling-out the magnetic tape T is made to be the shortest as described above, the path of the magnetic tape T also is short as a matter of course. Thus, the contact wear of the magnetic tape T and a tape guide (e.g., a roller which is rotatably supported or the like) can be decreased. Moreover, the opening 20 is formed by cutting off a corner portion of the case 12, and is directed in the direction of arrow A and the direction of arrow B. The range of directions over which the pull-out mechanism (the hooks or the like) can access the leader pin 22 is broad, and the range of positions at which the leader pin 22 can be set within the case 12 is broad. As described above, the locus of operation of the door 50 does not interfere with positions at which the leader pin 22 can realistically be set. Thus, the degrees of freedom in designing the drive device are increased.

The door 50 is a separate member from the leader pin 22 which is pulled out from the case 12. Thus, in the assembled state, the door 50 cannot be removed from the case 12. Accordingly, the door 50 does not come out of the case 12 due to impact or the like when the recording tape cartridge 10 is dropped. In addition, when the magnetic tape T is not being used, the leader pin 22 is accommodated within the case 12 which is in a tightly closed state in which the opening 20 is closed by the door 50. It is therefore difficult for the leader pin 22 to become scratched or dirtied. Thus, the pulling-out and the conveying of the magnetic tape T within a drive device are not affected, and the magnetic tape T itself is not damaged.

The door 50 opens and closes the opening 20 by sliding in a state in which the convex portions 51 are supported between the guide wall portions 42. Thus, there is no need to form grooves or the like in the inner surfaces of the case 12 as in the conventional art. Accordingly, the rigidity of the case 12 does not deteriorate. In addition, the holding projection 54, to which the coil spring 56 is attached, projects so as to be directed upwardly in the same way (in the same one direction) as the anchor projection 55 of the lower case 18. Therefore, the coil spring 56 can easily be attached and removed from above (from one direction). Accordingly, the assembly performance of the door 50 and the coil spring 56 into the case 12 can be improved.

The rib 57, which the holding projection 54 slidingly contacts at the time when the door 50 is opened and closed, is provided in the upper case 16. Therefore, the coil spring 56 can expand and contract in a state in which swinging (shaking) thereof is suppressed. Accordingly, when the door 50 moves in the direction of opening the opening 20 against the urging force of the coil spring 56, the door 50 is guided more stably than it would be if guided only by the guide wall portions 42. Moreover, even if impact or the like caused by dropping is applied to the case 12, the rib 57 can prevent the coil spring 56 from coming off of the holding projection 54.

As described above, in accordance with the present invention, one end of an urging member, which urges a closing member in a direction of closing an opening, is attached to an anchor projection which projects from an inner surface of a case, whereas the other end of the urging member is attached to a holding projection which projects from the closing member in the same direction as the anchor projection. Thus, the urging member can be attached from one direction, which is the direction in which both the anchor projection and the holding projection are directed. The assembly performance of the closing member and the urging member into the case can be improved.

What is claimed is:

1. A recording tape cartridge which is loaded into a drive device from a predetermined loading direction for use, the recording tape cartridge comprising:

a case for rotatably accommodating, at an interior of the case, a single reel on which a recording tape is wound, the case having a wall surface in which is formed an opening for pulling-out of the recording tape;

a closing member provided slidably within the case, for opening and closing the opening; and an urging member for urging the closing member to move in a direction of closing the opening, the urging member having end portions, wherein the case has, at the interior of the case, an anchor projection for attachment of one end portion of the urging member, and the closing member has a holding projection for attachment of another end portion of the urging member, and the distal ends of the holding projection and the anchor projection respectively project in a same direction.

2. The recording tape cartridge of claim 1, wherein the urging member has a coil spring, and both ends of the coil spring have loop-shaped portions through which one of the anchor projection and the holding projection passes.

3. The recording tape cartridge of claim 2, wherein the anchor projection has a substantially solid cylindrical shape, and the one end portion of the urging member is attached to the anchor projection by the anchor projection passing through one of the loop-shaped portions.

4. The recording tape cartridge of claim 2, wherein the holding projection has a substantially solid cylindrical shape, and the one end portion of the urging member is attached to the holding projection by the holding projection passing through one of the loop-shaped portions.

5. The recording tape cartridge of claim 1, wherein the wall surface in which the opening is formed has a surface which is inclined in the loading direction.

6. The recording tape cartridge of claim 1, wherein the case has a front wall at a loading direction front side of the case, and a side wall which runs along the loading direction, and the wall surface in which the opening is formed is formed between the front wall and the side wall.

7. The recording tape cartridge of claim 1, wherein the closing member has a plate which is curved in a substantial arc-shape having a radius.

8. The recording tape cartridge of claim 7, wherein the closing member is held so as to be slidable on a predetermined locus within the case.

9. The recording tape cartridge of claim 8, wherein the case has a guide wall which slidably holds the closing member, and the guide wall defines the predetermined locus.

10. The recording tape cartridge of claim 9, wherein the curved plate has a side edge portion which runs along a sliding direction of the plate, and the side edge portion has a plurality of convex portions, and the convex portions are held and guided by the guide wall.

11. The recording tape cartridge of claim 8, wherein the predetermined locus forms an arc-shape having substantially a same radius as the curved plate.

12. The recording tape cartridge of claim 11, wherein the reel has a predetermined radius, and a radius of the locus is greater than the radius of the reel.

13. The recording tape cartridge of claim 1, wherein the case has a rib at the interior of the case, and the rib is formed so as to contact the holding projection along a path of movement of the holding projection.

14. The recording tape cartridge of claim 1, wherein the case has a side wall which is substantially parallel to the loading direction, and the closing member has a projection which is movable in the loading direction in a state of being exposed from the side wall, and when the recording tape cartridge is loaded in a drive device, the projection receives force in a direction opposite to the loading direction and moves relative to the case, and the closing member is thereby slid so as to open the opening.

15. The recording tape cartridge of claim 14, wherein a slit is formed in the side wall so as to expose the projection, and the slit extends in the loading direction and opens towards the opening.

16. The recording tape cartridge of claim 1, wherein the case includes two case sections, each of which has a base surface and a peripheral wall surrounding the base surface, and end portions of the peripheral walls of the case sections are joined to each other with the recording medium being accommodated within the case, and wherein the anchor projection projects from the base surface of one of the case sections, and a height of the anchor projection is such that the anchor projection extends beyond the end portion of the peripheral wall of the one of the case sections.

17. The recording tape cartridge of claim 1, wherein a rib for regulating a region, in which the reel is accommodated, is provided within the case, and the anchor projection is formed such that at least a portion thereof connects to the rib.

* * * * *